United States Patent [19]

Kurandt

[11] 4,177,053
[45] Dec. 4, 1979

[54] METHOD FOR THE PRODUCTION OF PHOSPHORIC ACID WITH HIGH CONTENTS OF FERTILIZER-NUTRIENTS

[75] Inventor: Hans-Friedrich Kurandt, Lüneburg, Fed. Rep. of Germany

[73] Assignee: Veba-Chemie Aktiengesellschaft, Gelsenkirschen-Buer, Fed. Rep. of Germany

[21] Appl. No.: 703,034

[22] Filed: Jul. 6, 1976

Related U.S. Application Data

[63] Continuation of Ser. No. 513,982, Oct. 11, 1974, abandoned.

[30] Foreign Application Priority Data

Oct. 11, 1973 [DE] Fed. Rep. of Germany ....... 2351031
Mar. 15, 1974 [DE] Fed. Rep. of Germany ....... 2412503

[51] Int. Cl.² ............................................. C05B 11/06
[52] U.S. Cl. ............................................ 71/36; 71/39; 71/40; 423/319; 423/320
[58] Field of Search .................. 71/34, 36, 39, 40, 63, 71/DIG. 3; 423/319, 320

[56] References Cited

U.S. PATENT DOCUMENTS

| | | | |
|---|---|---|---|
| 3,429,686 | 2/1969 | Dingemans et al. ................ | 71/39 |
| 3,475,153 | 10/1969 | Abbott et al. ..................... | 71/36 X |
| 3,515,534 | 6/1970 | Livingston ........................ | 71/34 |
| 3,600,154 | 8/1971 | Slot et al. ........................ | 71/39 X |
| 3,632,307 | 1/1972 | Van Es ............................. | 423/320 X |
| 3,690,826 | 9/1972 | Husken ............................. | 423/320 |
| 3,729,304 | 4/1973 | Elmendorp et al. ................ | 71/34 |
| 3,835,215 | 9/1972 | Marquis et al. ................... | 423/320 X |

FOREIGN PATENT DOCUMENTS 658865  10/1951  United Kingdom ..................... 71/39

OTHER PUBLICATIONS

Phosphoric Acid, vol. 1, part 1, A. V. Slack, pp. 290 and 334.
Phosphoric Acid, vol. 1, part 1, A. V. Slack, 1968, pp. 279-282, 332-336, 350-355, 373-377.

*Primary Examiner*—Robert H. Spitzer

*Attorney, Agent, or Firm*—Sprung, Felfe, Horn, Lynch & Kramer

[57] ABSTRACT

Phosphoric acid with a high fertilizer-nutrient content is produced by decomposing phosphate rock with nitric acid followed by precipitation of calcium ions with sulfate. The steps of the process are as follows:

A. Decomposing phosphate rock with (7-2x) to (17-2x) mol nitric acid and x mols sulfuric acid per mol phosphorous pentoxide
 $A_1$ whereby x may take on any values between 0 and a maximum value X, which is limited
 $A_2$ by the condition that the mol ratio $H_2SO_4:HNO_3$ may never exceed the value 8:1 and
 $A_3$ by the condition that in the decomposition solution, into which, if need be, also ammonium sulfate is introduced, the content of sulfate ions after precipitation of the semihydrate gypsum is between 10 to 150 g/l solution;

B. Adding—if no or not enough sulfuric acid has been used for precipitating calcium sulfate—ammonium sulfate in amounts corresponding to condition $A_3$ in the beginning, while or after the decomposition process in this way choosing by step A and B a proportion between the use of sulfuric acid and ammonium sulfate corresponding to the economical situation of the day or the N:P proportion wanted in the produced N-containing phosphoric acid;

C. Adjusting the acid decomposition mixture for decomposing the phosphate rock in the beginning of the process corresponding to the available acids by admixing with corresponding portions of the aqueous filtrates in a way that the developing nitrogen containing phosphoric acid has a total water content
 $C_1$ of 65 to 40% by weight, if only $(NH_4)SO_4$ is used for supplying sulfate,
 $C_2$ of 55 to 20% by weight, if only $H_2SO_4$ is used for supplying sulfate or
 $C_3$ of 65 to 20% by weight, if mixtures of $(NH_4)_2SO_4$ and $H_2SO_4$ are used for supplying sulfate;

D. Separating the purified calcium sulfate semihydrate from the acid solution by filtration or centrifugation;

E. Carrying out steps A, B and D at a temperature of about 60° to 100° C.

16 Claims, No Drawings

METHOD FOR THE PRODUCTION OF PHOSPHORIC ACID WITH HIGH CONTENTS OF FERTILIZER-NUTRIENTS

This is a continuation, of application Ser. No. 513,982, filed Oct. 11, 1974, now abandoned.

BACKGROUND

The invention relates to a method for the production of phosphoric acid with high contents of fertilizer-nutrients and of filterable calcium sulfate-semihydrate through decomposition of phosphate rock with nitric acid with the addition of sulfate in the form of ammonium sulfate or sulphuric acid while adhering to the optimal requirements for the precipitation of calcium sulfate-semihydrate in regard to acid-concentration and working temperature. The filtrate of the decomposition can—by adding further nutrients or decomposition material—be worked into multinutrient-fertilizers in the usual manner.

When producing multi-nutrient-fertilizers with the hitherto customary nitro-phosphate method, rock phosphate is decomposed with a mixture of nitric- and phosphoric acid, i.e. with a nitrogen-containing phosphoric acid, whereby, subsequently, this decomposed mixture is neutralized by adding ammonia. Afterwards, in a given case, after the addition of potash- or other salts, the mixture is granulated. The nitro-phosphate method is easy to handle but it has the disadvantage that phosphoric acid must be used, the reltatively high price of which has a negative effect on the economics of the end product.

In order to decrease these economic disadvantages, various methods for the production of multi-nutrient fertilizers have become known which work with decreased use or no use of phosphoric acid.

It is known to carry out the rock phosphate decomposition only with nitric acid and to subsequently separate through cooling a part of the calcium ions in the form of calcium nitrate, which then can be used for the production of calcium ammonium nitrate (Odda-process).

It is also known to precipitate the calcium ions which result from the nitric acid decomposition of rock phosphate with ammonium sulfate in the form of gypsum, $CaSO_4 \times 2H_2O$, whereby the gypsum is usually rejected as waste product and the developing nitrogen-containing phosphoric acid is worked further into multi-nutrient fertilizers. This method has the advantage that ammonium sulfate can be used whose sulfate part is usually cheaper than that of the technical sulphuric acid, so that one can save on expenditures in this manner.

This known method makes a complicated purification of the gypsum from the soluble sulfates necessary. For this considerable amounts of water are necessary which later on must be evaporated again during the production of fertilizers. The filtering area required with this method is extremely high, 2.5–5 $m^2/t$ gypsum. On the other hand, nutrient losses occur with insufficient washing out. As already mentioned, the remaining clinging impurities usually influence the thus obtained gypsum to such an extent that it no longer can be used for building purposes.

SUMMARY

It has now been discovered that ammonium sulfate can be used as precipitant for the calcium ions of the rock phosphate decomposition without using complicated purification methods if one works in such a manner, that a. for the decomposition of the rock phosphate 7 to 17 mol $HNO_3$/mol $P_2O_5$ are used, b. the nitric acid used therein or the nitric acid wash water filtrate mixture used therefor is adjusted to a $HNO_3$-concentration of 35–60% by weight, preferably of 45–55% by weight, c. enough ammonium sulfate is introduced to the decomposition solution that 10–150 g free $SO_4^{2-}$/l solution, preferably 50 g/l are present, and that d. the decomposition and the separation of the calcium sulfate-semihydrate is carried out at a temperature of 60°–100° C., preferably at 70°–80° C.

DESCRIPTION

The method according to the invention takes advantage of the use of cheap ammonium sulfate, however, it avoids the above mentioned shortcomings. With the working conditions of the method according to the invention one achieves that the calcium ions, which become free when dissolving the rock phosphate in nitric acid, are not precipitated as gypsum $CaSO_4 \times 2H_2O$, but as semihydrate $CaSO_4 \times \frac{1}{2}H_2O$. This makes it possible to produce an extraordinarily pure calcium sulfate without inclusion of mentionable amounts of ammonium sulfate.

With the addition of rock phosphate to the decomposition acid it is expedient to add simultaneously ammonium sulfate in such quantities that there is a surplus of $SO_4^{2-}$ in the decomposition solution. Free $SO_4^{2-}$-ions in a concentration of at least 10 g $SO_4^{2-}$/l decomposition solution should be present. Generally, this surplus will be kept somewhat higher, for example at about 50 g $SO_4^{2-}$/l decomposition solution.

Under the cited conditions, well-formed calcium sufate-semihydrate crystals form already after a short time which are so large that they can be filtered extraordinarily well. The deposit usually consists of mixtures of large crystals which cling to one another, partly also of single crystals. Due to the favorable surface:volume ratio, the precipitation can be purified with little water from the clinging impurities. Thus, the method according to the invention proves itself extraordinarily simple and economical.

The separation of the nitrogen-containing phosphoric acid from the calcium sulfate-semihydrate can take place via a filter, but also a centrifuge may be used. In order to make do with as small an amount of wash water as possible, a counter-flow washing in multiple steps is recommended. Due to the good crystal formation, little water adheres to the semihydrate crystals. When filtering with a vacuum filter, the calcium sulfate has a water content of only 20–25%, corresponding to about 15%–20% free (and 5.3–5.0% bound) water. When separating with a centrifuge, a total water content of about 15% can even be reached.

The setting time of the calcium sulfate-semihydrate to calcium sulfate-dihydrate takes place so slowly under the conditions according to the invention that crusting on the filter can be avoided. The filtration velocity is so high that even with a 4-step filter a filter area of 0.8 $m^2/t$ semihydrate is sufficient, whereby for the filtration, without considering the washing, only about 0.3 $m^2$ filter area/t semihydrate are required.

A recirculation of the filtrate is not necessary, in contrast to the known dihydrate method. This means that a recirculation pump is not required and thus energy is saved.

The nitric acid concentration and the decomposition temperature must be adjusted in such a manner to one another in the method according to the invention that calcium sulfate-semihydrate develops.

The initial nitric acid concentration usually will depend upon the nitric acid available in the factory, whereby the nitric acid which was introduced in the reactor is adjusted, through addition of reintroduced filter wash water, to a concentration of 35–60% $HNO_3$, preferably 45–55%. When determining the nitric acid concentration, the materials present in the wash water, such as ammonium nitrate, phosphoric acid, etc., are not considered. The reactor temperature is expediently adjusted to 60°–100° C., preferably 70°–80° C.

In this connection, with low $HNO_3$ concentrations the higher temperature ranges are preferred, while in the case of higher acid concentrations also the low temperature ranges can be used with optimal yields, however, the method according to the invention can generally be carried out in the cited ranges of temperatures and concentrations.

If one proceeds from the reaction equation

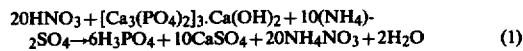

$$20HNO_3 + [Ca_3(PO_4)_2]_3 \cdot Ca(OH)_2 + 10(NH_4)_2SO_4 \rightarrow 6H_3PO_4 + 10CaSO_4 + 20NH_4NO_3 + 2H_2O \quad (1)$$

then 2 mol $HNO_3$ to 1 mol $CaSO_4$ are to be used or, assuming that $CaSO_4$ is separated with a total water content of 23%, at least 0.713 t $HNO_3$/t filter residue. If one uses 0.80 t $HNO_3$/t filter residue (corresponding to about 7.5 mol $HNO_3$/mol $P_2O_6$), then one must use the acid amounts cited in column b, in each case according to the concentration of the nitric acid used (column a of the following table), or one uses the amounts of water stated in column c.

Table

Permissible amounts of introducable wash water Z (1 $H_2O$) for the intended introduction of a wash water-nitric acid-mixture (WAM) of 48% by weight $HNO_3$ per ton filter residue (F) with 23% total water for the rock phosphate decomposition for the introduction of 0.80 t $HNO_3$/t filter residue dependent on the concentration of the nitric acid used (A) between 40 and 88% per weight $HNO_3$.

| a<br>Concentration of<br>Acid used<br>% by weight<br>$HNO_3$ | b<br>$\frac{tA}{tF}$ | c<br>1 $H_2O$ addition<br>by<br>$1A/tF$<br>$1/tF$ | d<br>Permissible Water<br>addition for 48%<br>$HNO_3$ in WAM<br>1 $H_2O/tF$ |
|---|---|---|---|
| 88 | 0.909 | 109 | 758 |
| 84 | 0.952 | 152 | 715 |
| 80 | 1.000 | 200 | 667 |
| 76 | 1.053 | 253 | 614 |
| 72 | 1.111 | 311 | 556 |
| 68 | 1.176 | 376 | 491 |
| 64 | 1.250 | 450 | 417 |
| 60 | 1.333 | 533 | 334 |
| 56 | 1.429 | 629 | 238 |
| 52 | 1.538 | 738 | 129 |
| 48 | 1.667 | 867 | — |
| 44 | 1.818 | 1018 | (−151) |
| 40 | 2.000 | 1200 | (−333) |

Not considering the evaporation losses during the decomposition and the amounts $NH_4NO_3(NH_4)_{2-x}H_{1+x}PO_4$, $(NH_4)_2SO_4$ etc., which are reintroduced with the wash water, then (considering the water content of 867 l/t filter residue for a 48% acid) the amount of water in column d results, which may be added to a decomposition mixture with 48% per weight $HNO_3$. Corresponding tables can be derived at without difficulties for other desired $HNO_3$ concentrations, other $HNO_3$ uses per mol $P_2O_5$ or tA/tF or other average total water contents in the filter residue.

Tests have shown that for the multiple stage washing of 1 ton calcium sulfate-semihydrate with a total water content of 23%, at least 400 l wash water are required for the recovery of a practically $(NH_4)_2SO_4$-free product. It is evident from the table that up to a nitric acid concentration of 64% the entire wash water can be reintroduced to the reactor. In the event that only nitric acid of lower $HNO_3$ concentration is available, it is recommended to reintroduce to the reactor only a part of the wash water or none at all. In a given case, the wash water filtrates can again be united with the production of the nitrogen-containing phosphoric acid even after corresponding evaporation to the admissible volume and can be used in the customary manner for the production of multi-nutrient fertilizers.

Products of technical purity can be used as ammonium sulfate. The method of production is practically of no importance in regard to the achieved yields.

The phosphoric acid produced in this manner is technically pure—aside from the admixtures of $HNO_3$, $NH_4NO_3$ and $(NH_4)SO_4$, desired for the later introduction for the production of fertilizers.

During further study of this method it was determined that the addition of the sulfate in the form of ammonium sulfate can be completely or partially replaced by the addition of equivalent amounts of sulphuric acid, if, simultaneously, the total water content of the decomposition acid mixture is regulated through the addition of the filter wash water amount in such a way that the produced nitrogen-containing phosphoric acid has a water content of 20 to 55% by weight, preferably of 25 to 40% by weight.

The added sulphuric acid in general is used already with the decomposition acid instead of the equivalent amounts of nitric acid. The decomposition method with the addition of the sulfate amounts in the form of sulphuric acid required for precipitation showed that the concentration range of the permissible water in the acid mixture must be changed, namely from 65 to 40% by weight to 55 to 20% by weight, preferably to 40 to 25% by weight, $H_2O$. It furthermore proved advantageous to carry out the decomposition and the separation of the semihydrate gypsum at about 10° higher temperatures than with the method with exclusive addition of ammonium sulfate.

The decomposition method with exclusive introduction of sulphuric acid as precipitation sulfate consists of a combination of steps according to which a. one uses for the decomposition of the rock phosphate ($a_1$) $(7-2x)$ to $(17-2x)$ mol $HNO_3$ and x moles $H_2SO_4$/mol $P_2O_5$, ($a_2$) whereby x may take on any values between 0 and a maximum value X, which is limited by the following, namely that the mol ratio $H_2SO_4:HNO_3$ may never become greater than 8:1, and ($a_3$) that in the decomposition solution, into which in a given case ammonium sulfate is yet introduced, after precipitation of the semi-hydrate gypsum at least 10 g and at the most 150 g, preferably about 50 g, free $SO_4^{2-}$-ions/l solution should be present, and according to which b. the acid decomposition mixture—preferably by reusing of water filtrates—is adjusted to such total water contents that the developing nitrogen-containing phosphoric acid has a water content of 20 to 55% by weight, preferably of 25 to 40% by weight, and c. the decomposition and the separation of the calcium sulfate-semihydrate is undertaken at a temperature of 60° to 110° C., preferably at 70° to 90° C.

With the introduction of concentrated sulphuric acid, the high temperature required for the separation process of calcium sulfate-semihydrate can be reached already without additional adding of steam, since the high heat of dilution of this acid in water or in aqueous nitric acid supplies the heat required therefor.

Furthermore, the selective introduction of sulphuric acid and/or soluble sulfates, such as ammonium sulfate, permits an economical adjustment to the particular price- and raw material situation in the best possible manner.

Technically produced acids of any origin can be used as sulphuric acid. Usually, concentrated sulphuric acid, i.e. one with a content of about 96%, is used. Of course, the use of sulphuric acid with lower concentration, e.g. of 80% by weight is possible.

Of course, the sulfate-addition for precipitation of the calcium in the decomposition solution can be done in various mixtures of sulphuric acid or ammonium sulfate (or other water-soluble sulfates), provided the sum of the sulfate ions does not go beyond the above defined maximum value X. The permissible amounts of water in the wash water acid mixture and the optimum precipitation- and separation temperatures are evident logically from the law of mixtures and the corresponding data of extreme cases.

The method according to the invention is thus characterized, in that a. one uses for the decomposition of the rock phosphate (7−2x) to (17−2x) mol $HNO_3$/mol $P_2O_5$, whereby x are the moles $H_2SO_4$/mol $P_2O_5$ and x may be all values between 0 and a maximum value X which is characterized by the requirement b and by the following, namely that the mol ratio $H_2SO_4$:$HNO_3$ may never become higher than 8:1, as well as that one b. adds enough sulfate in the form of ammonium sulfate or sulphuric acid to the decomposition solution that 10 to 150 g free $SO_4^{2-}$/l solution are present, preferably 50 g/l and c. one adjusts the decomposition solution used or the acid wash water filtrate mixture used therefor in such a manner—in a given case by increasing the addition amount of the filter wash water—that the entire water content of the decomposition acid mixture amounts 1. in the case of the addition of ammonium sulfate to 65 to 40% by weight, preferably 55 to 45% by weight, or
  2. in the case of the addition of sulphuric acid to 55–20% by weight, preferably 40–25% by weight, or
  3. in the case of the addition of sulphuric acid ammonium sulfate mixtures one adjusts to corresponding intermediate values from case 1 to 2, and that d. the decomposition and the separation of the calcium sulfate-semihydrate is carried out at a temperature of 60° to 110° C., preferably at 70° to 90° C.

The sulfate content in the rock phosphate decomposition mixture is analytically supervised, preferably by nephelometric methods (by using barium chloride solution). In a given case, the amounts of the $H_2SO_4$—or $(NH_4)_2SO_4$—addition must subsequently be increased or decreased. However, by and large, the calculated additions are sufficient, which are derived at from the analysis of the rock phosphate used in each case, in particular from its $P_2O_5$ content.

The rock phosphate decomposition, when using exclusively sulphuric acid as precipitant, takes place in accordance with the following reaction equation:

$(20-2y)HNO_3 + Ca_3(PO_4)_2 \cdot Ca(OH)_2 + yH_2SO_4 + (10-y)(NH_4)_2SO_4 + 3H_2O \rightarrow 6H_3PO_4 + 10CaSO_4 \cdot \tfrac{1}{2}H_2O + (20-2y)NH_4NO_3$    (2)

This equation determines the minimum requirement of acid in the form of nitric- and/or sulphuric acid for the decomposition of a (exclusively consisting of hydroxyl apatite) rock phosphate. The total amount of the sulfate ions m' to be introduced, which are required for the precipitation of the calcium ions of the rock phosphate decomposition in question, result from those in the form of sulfate y, in the form of ammonium sulfate y' and the surplus Δ' (in the form of sulfate or ammonium sulfate), which is required so that in each case of the existing volume of the decomposition solution a surplus of 10 to 150 g $SO_4^{2-}$/l corresponding to 0.1 to 1.5 g mol $SO_4^{2-}$/l solution results:

$m' = y + y' + \Delta'$

The following results according to the above reaction equation—valid for the decomposition of each 3 mol $P_2O_5$:

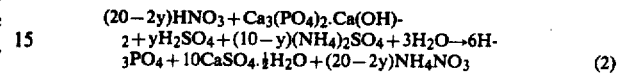

or, if correspondingly, one only refers to 1 mol $P_2O_5$:

$m = m'/3 = (3.33 + \Delta)$ Mole $SO_4^{2-}$/Mol $P_2O_5$ whereby m and Δ represent the corresponding values related to the decomposition of only 1 mol $P_2O_5$.

According to the cited equation, 20 mol $H^+$-ions (in the form of $HNO_3$ and/or $H_2SO_4$) are used on each 3 moles $P_2O_5$, i.e. 6.67 moles $H^+/P_2O_5$. According to the method with exclusive ammonium sulfate introduction as precipitation sulfate, 7 to 17 moles $H^+$/mol $P_2O_5$ are used. The $HNO_3$-surplus serves for the decomposition of possible secondary ingredients or for the compensation of nitrogen losses due to the decomposition of the $HNO_3$ due to the presence of reducing materials in the rock phosphate and for the acceleration of the decomposition speed. The amounts of acid used beyond the equivalence remain in the filtrate in the form of $HNO_3$ and cause its nitrogen content—aside from (the added $(NH_4)_2SO_4$ and/or) the formed $NH_4NO_3$. If one neglects the other secondary ingredients of the rock phosphate and the possible decomposition reactions as well as the addition Δ of sulphuric acid and/or ammonium sulfate required for the adjustment of the sulfate surplus of 50 to 150 g $SO_4^{2-}$/l solution, then the equation

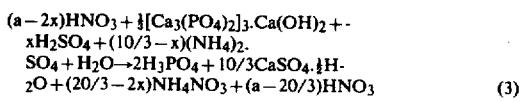

(3)

is the basis of a decomposition per mol $P_2O_5$ of the rock phosphate according to the invention, whereby $$7 < a < 17$$

must remain.

When working up to multi-nutrient fertilizers, the surplus acid is converted through corresponding amounts of ammonia to ammonium nitrate and thus the N-content of the product is further increased.

According to the above reaction equation the decomposition in concentrated sulphuric acid without introduction of nitric acid would take place for a (prohibited per se) a-value of $6\frac{2}{3}$ and for $x=10/3$ and $x'=(10/3-x)=0$. In this case also the separation of the semihydrate-gypsum would take place in relatively concentrated sulphuric acid, i.e. the purification effect of the nitric acid on the precipitated semihydrate could not be utilized.

When using nitric acid amounts in the order of magnitude of 7 to 9 mol $HNO_3$/mol $P_2O_5$, one should, therefore, never completely utilize the permissible amount of sulphuric acid of $$3.33 \text{ Mol } H_2SO_4/\text{Mol } P_2O_5 + \Delta$$

but should let the $H_2SO_4$:$HNO_3$-mol ratio increase up to 8:1 at the most.

With a total acid content of $7H^+$/mol $P_2O_5$ at the most $3\ 5/17=3,294$ moles $H_2SO_4$ may be used with $7/17=0.412$ moles $HNO_3$, with $8H^+$/mol $P_2O_5$ at the most $3\ 13/17=3.765$ moles $H_2SO_4$ with $8/17=0.471$ moles $HNO_3$ and with $9H^+$/mol $P_2O_5$ at the most $4\ 4/17=4.235$ moles $H_2SO_4$ with $9/17=0.529$ moles $HNO_3$.

According to equation (3), the rock phosphate should have a $P_2O_5$ content of almost 42.4%. Rock phosphates with 28 to 40% by weight $P_2O_5$ thus have ballast contents of 34 to 5.7% or such with 32 to 36% $P_2O_5$ of 24.5 to 15%. The ballast materials can be dissolved via the decomposition acids in varying amounts, or they remain—similar to the main amounts of the $CaF_2$ portion of the fluor apatite—undissolved. That which remained undissolved is separated with the semihydrate gypsum during filtration.

A rock phosphate with for example 35.5% by weight $P_2O_5$ contains accordingly per each 100 g $\frac{1}{4}$ mol $P_2O_5$ (or 2.5 mol $P_2O_5$/kg) and 16.3 g ballast material/100 g rock phosphate. According to the equation (3) then per 100 g each of rock phosphate $10/3 \cdot \frac{1}{4}$ mol calcium sulfate-semihydrate corresponding to $1451.5/12$ g $\sim 121$ g are separated. In the case of 2 to 14 g undissolved ballast materials, in particular, in the case of, for example 7 g, these are 128 g dry residues, which yield, with a median water content of about 25%, a filter residue of 160 g with 32 g free and 7.5 g bound water, of which 4.5 g are taken from the water content of the added aqueous acid.

When using 7 to 17 mol $HNO_3$/mol $P_2O_5$ in the form of a 50% by weight acid, 110 to 268 g $HNO_3$ and the same amount of water are introduced for 100 g of rock phosphate with 35.5% by weight $P_2O_5$, as well as $\sim 110$ g ammonium sulfate when neglecting the prescribed sulfate surplus.

Accordingly, the total decomposition amounts to

| g rock phosphate | g $HNO_3$ | g $(NH_4)_2SO_4$ | g $H_2O$ |
|---|---|---|---|
| 100 + | 110 + | 110 + | 110 = 430 g or |
| 100 + | 268 + | 110 + | 268 = 746 g, | whereby, as derived from above, about 160 g are filtered off, so that when neglecting the water losses through evaporation, 270 and/or 586 g filtrate with water contents of $110-36.5=73.5$ g corresponding to 27.2% by weight, and/or $268-36.5=231.5$ g corresponding to 39.5% by weight are obtained.

With the partial replacement of nitric acid by sulphuric acid while retaining the total water content of 50% by weight of the mixture of sulphuric acid, nitric acid and wash water filtrate used for decomposition, for example with equivalent replacement of the ammonium sulfate by $H_2SO_4$, one obtains total decomposition solutions of

| g rock phosphate | g $HNO_3$ | g $H_2SO_4$ | g $H_2O$ |
|---|---|---|---|
| 100 + | 5.2 + | 81.5 + | 86.7 = 273.4 g or |
| 100 + | 163.2 + | 81.5 | 244.7 = 589.4 g | or filtrates of 113.4 g and/or 429.4 g with water contents of $86.7-36.5=50.2$ g corresponding to 44% by weight or $244.7-36.5=208.2$ g corresponding to 48.5% by weight.

Even though in this pair of examples the first is not admissible according to the invention due to the prohibition of exceeding the $H_2SO_4$:$HNO_3$-ratio of 8:1, it does show that the total acid content has only minor influence on the total water content of the produced acid. Since to the replacement of the ammonium sulfate by sulphuric acid, a decrease of the portion of secondary ingredients corresponds, the water content in the produced phosphoric acid increases with increasing sulphuric acid addition with unchanged water content in the decomposition acid mixture.

For a decomposition acid with 65% by weight total water a decomposition solution of

| g rock phosphate | g $HNO_3$ | g $H_2SO_4$ | g $H_2O$ |
|---|---|---|---|
| 100 + | 5.2 + | 81.5 + | 161 = 347.7 g or |
| 100 + | 163.2 + | 81.5 + | 455 = 799.7 g | would be present in the case of the aforementioned example pair, i.e. it would contain filtrates of 187.7 or 639.7 g, which would have water contents of $161-36.5=124.5$ g corresponding to 66.3% by weight and/or $455-36.5=418.5$ g corresponding to 65.4% by weight $H_2O$. Even if one assumed evaporation losses of several percent of water, it shows that one cannot in this manner produce nitrogen-containing phosphoric acid with a water content below 55% by weight. The restriction of the addition of the wash water filtrate to amounts, which leave the total water content of the produced phosphoric acid below 55%, means a restriction vis-a-vis the water content of the decomposition mixture permissible in the method with exclusive ammonium sulfate addition, in the case of the rock phosphate with 35.5% by weight $P_2O_5$ and the content of insoluble ballast material assumed in instant example, only decomposition acids with total water contents of 53.5 to 51.3% by weight would be permissible. Due to the necessary sulfate surplus and the partial evaporation of water during the decomposition, the permissible limit for 7 to 17 mol $H^+$/mol $P_2O_5$ could move somewhat towards higher values, while losses of HNO₃ by decomposition to gaseous constituents would lower it. With the breadth of range of the analysis values of the rock phosphates used it appears therefore not only expedient but also necessary that the permissible water content is referred to the N-containing phosphoric acid produced and not to the per se easier accessible $H_2O$ content of the acid wash water filtrate mixture.

The determination of the water content in the nutrient-rich phosphoric acid takes place with Karl-Fischer reagent. With constant working conditions, i.e. with about the same concentrations and mixing portions of $HNO_3$, $H_3SO_4$, ammonium sulfate and rock phosphate, the water content of the produced phosphoric acid can also be very rapidly determined by "spindles", if one has undertaken corresponding standard measuring (depending on the temperature). When changing the type of the rock phosphate or in the case of other changes, restandardizations must perhaps be carried out.

Although the permissible amounts of the wash water vis-a-vis methods with addition of exclusive ammonium sulfate are limited, similar considerations result for their derivations as for the formerly mentioned—according to the mol ratio of the nitric acid and sulphuric acid used.

The products resulting with the method with exclusive addition of sulphuric acid as precipitation reagent are poorer in nitrogen as compared to the primarily developing phosphoric acid under the method with exclusive addition of ammonium sulfate, namely they contain 2x mol $NH_4NO_3$/mol $P_2O_5$ or 4x mol N/mol $P_2O_5$ less.

For the simplified case $a=7$ and $\Delta=0$, for $x=3,294$ mol $H_2SO_4$ one gets each 0.079 mol $NH_4NO_3$ and 0.33 mol $HNO_3$ to 1 mol $P_2O_5$, i.e. a $N:P_2O_5$-mol-ratio of 0.491:1.

Therefore, the nitrogen-containing phosphoric acid produced accordingly has a $N:P_2O_5$ weight ratio of 0.097:1 and the mixtures obtainable therefore through neutralization with $NH_3$ (to $NH_4NO_3$ and $(NH_4)_2HPO_4$) a $N:P_2O_5$-mol ratio of 2,824:1 or a $N:P_2O_5$-weight ratio of 0.558:1. By increasng the $HNO_3$ input—accordng to the invention an increase up to $(17-2x)$ mol $HNO_3$/mol $P_2O_5$ is permissible—the $N:P_2O_5$-mol or -weight ratios increase in the acid as well as in the fertilizer premixtures obtainable therefrom.

There is a $N:P_2O_5$-mol ratio of 13,667:1 for the phosphoric acid produced according to the method with ($x=0$ and) $a=7$, or a corresponding weight ratio of 2.7:1, whereas for the fertilizer mixtures obtainable therefrom correspondingly, there is a $N:P_2O_5$-mol ratio of 16.0:1 or a $N:P_2O_5$-weight ratio of about 3.16:1. While the fertilizers, which are introduced with nitrogen-rich phosphoric acid with the help of exclusive ammonium sulfate obtained with the method, phosphoric acid has yet to be added for the adjustment of a $N:P_2O_5$-weight ratio of 1:1 or 2:1, according to the method one directly reaches such products with exclusive addition of sulphuric acid as precipitation reagent for the calcium ions through suitable choice of the $HNO_3:H_2SO_4$-ratio and the total amount of acid.

For the production of fertilizers, a portion of non-water soluble $P_2O_5$ may be added to the NP-acid in order to additionally obtain a long lasting fertilizing effect.

In this case, it is expedient to add rock phosphate and mineral acids to the raw acid, break it down in the customary manner, neutralize and add the potash component and/or other desired additions and granulate and dry the product obtained in such manner.

As mineral acid for the post-decomposition one can, among others, use nitric acid, sulphuric acid or phosphoric acid individually or in any desired mixture.

One can also produce completely water-soluble multi-nutrient fertilizer from the nitrogen-containing phosphoric acid (NP-acid) through direct treatment with ammonia, whereby in a given case potash salts or other nutrients as well as trace elements may yet be added.

With the method using sulphuric acid exclusively or partially, one obtains particularly easily the N:P-ratios of 1:1, which, moreover, have even quite a high percentage. Thus, for instance, instant example 3 demonstrates a fertilizer of the type 17/17/17.

As compared to the known methods, the method according to the invention with the addition of ammonium sulfate as precipitant has, among others, the following advantages:

1. little (wash) water input, because of this
2. for the decomposition, when using the same nitric acid, a wash water nitric acid mixture with higher $HNO_3$-content (and more favorable decomposition effect) and
3. an NP-acid with higher $P_2O_5$ content or lower water content can be produced,
4. less investment costs, since a filter and/or centrifuge of smaller size and no recirculation pumps are required,
5. less energy requirement because of saving in pumps and stirring equipment and lowering of the filtering- and washing times,
6. better utilization of the $P_2O_5$ content of the rock phosphate used in the produced NP-acid,
7. direct recovery of a usable gypsum or rather savings of cumbersome, costly purification operations therefor.

To the variation of the method through partial or complete replacement of the ammonium sulfate by (equivalent amounts of) sulphuric acid, there is the following in addition:

8. favorable heat budget; supply of energy is practically not necessary,
9. higher total $P_2O_5$ content in the N-containing phosphoric acid,
10. easier adjustment of lower $N:P_2O_5$ weight ratios and cost-favorable replacement of the $P_2O_5$ additions in the form of $H_3PO_4$ through rock phosphate required in the production of multi-nutrient fertilizers with low $N:P_2O_5$ weight ratio,
11. easier adjustment to the raw material situation by selective exchange of sulphuric acid and ammonium sulfate.

EXAMPLE 1

5 tons of kola-phosphate with 39% $P_2O_5$ and 52% CaO are hourly introduced in a continuous process into a reactor of 50 m³ content together with 6.65 to ammonium sulfate. Simultaneously, the addition of 8 m³ of 64% nitric acid and backstirring of the wash water filtrate from the filtration of the calcium sulfate takes place. The soluble $SO_4{}^{2-}$-content of the reactor solution amounts to 50 g $SO_4{}^{2-}$/l. The developing mixture is filtered off on a 9 m² box type belt filter and washed with 3.2 m³ water in the counter flow. The resulting washed calcium sulfate-semihydrate (6 t/h) has the following composition:

| | | |
|---|---|---|
| $P_2O_5$ | total | 0.2 % |
| $P_2O_5$ | water-soluble | 0.02 % |
| $NH_3-N$ | | 0.08 % |
| $NO_3-N$ | | 0.04 % |
| $H_2O$ | total | 23.0 % |

The filtered off, nitrogen-containing phosphoric acid has the following composition:

| | | |
|---|---|---|
| $P_2O_5 = 10.7\%$ | = | 14.8 % $H_3PO_4$ |
| | | 39.5 % $NH_4NO_3$ |
| | | 4.1 % $(NH_4)_2SO_4$ |
| | | 8.1 % $HNO_3$ |
| | | 3.5 % impurities incl. dissolved $CaSO_4$ |
| | | 30.0 % $H_2O$ |
| | | 1.41 g/ml density at 20° C. |
| Recovered amount: | | about 12.8 m$^3$, corresponding to 18 t |

These 12.8 m$^3$ NP-acid, together with 8.7 m$^3$ 64% nitric acid, are used for the decomposition of further 4.3 t kola-phosphate. After the ammoniation of the decomposition mixture to pH 5.6, 12 to KCl are stirred in, the mixture is granulated and after drying 40 t of whole fertilizer with the composition 18/9/18 with a water soluble $P_2O_5$ component of 50% are produced.

EXAMPLE 2

1 t kola phosphate, as in example 1, is hourly added to a reactor with 0.16 t 64% $HNO_3$ and 0.95 t $H_2SO_4$ (96%). Simultaneously, the addition of the wash water filtrate from the filtration of the calcium sulfate takes place. The soluble $SO_4^{2-}$ content of the reactor solution amounts to 50 g $SO_4^{2-}$/l, the temperature is 90° C. The developing mixture is filtered off and the separated calcium sulfate is washed with 800 l water in the counter flow.

For the resulting (1.7 t) calcium sulfate-semihydrate, the following analysis values were determined after the washing:

| | | |
|---|---|---|
| $P_2O_5$ | total | 0.38 % |
| $P_2O_5$ | water-soluble | 0.05 % |
| $NO_3-N$ | | 0.01 % |
| $H_2O$ | total | 25.0 % | and for the filtered off nitrogen-containing phosphoric acid (1.1 t):

| | | |
|---|---|---|
| $P_2O_3$ | 35 % = | 49.0 % $H_3PO_4$ |
| $HNO_3$ | | 9.0 % |
| $SO_4^{2-}$ + | impurities | 6.0 % |
| $H_2O$ | | 36.0% |

EXAMPLE 3

4.4 t kola phosphate, as in example 1, are hourly added to a reactor with 4.5 t 60% $HNO_3$, 2.6 t concentrated $H_2SO_4$ and 2.2 t ammonium sulfate. Simultaneously, the addition of the wash water filtrate from the filtration of the calcium sulfate-semihydrate takes place. The reactor temperature is 85° C., the soluble $SO_4^{2-}$ content of the reactor mixture is 60 g/l. The developing mixture is filtered off and the calcium sulfate-semihydrate is washed in the counter flow with 3,500 l water.

The resulting calcium sulfate-semihydrate (7.5 t) contains the following constituents:

| | | |
|---|---|---|
| $H_2O$ | total | 26.2 % |
| $P_2O_5$ | total | 0.28 % |
| $P_2O_5$ | water-soluble | 0.02 % |
| $NO_3^--N$ | | 0.03 % |
| $NH_4^+-N$ | | 0.06 % |

The filtered off nitrogen-containing phosphoric acid (9.5 t) has the following composition:

| | | |
|---|---|---|
| $P_2O_5$ | 17.9 % = | 24.7 % $H_3PO_4$ |
| $HNO_3$ | | 6.0 % |
| $NH_4NO_3$ | | 27.7 % |
| $H_2O$ | | 33.8 % |
| $(NH_4)_2SO_4$ | | 5.5 % |
| impurities | | 2.3 % |

The produced acid is ammonized with ammonia up to a pH value of 5.8, 2.95 t KCl (58% $K_2O$) are hourly added and the mixture is granulated and dried. One obtains hourly 10 t of a fertilizer 17/17/17, for which the following analysis figures have been determined:

| | |
|---|---|
| ges.-N | 17.05 % |
| $NH_4^+-N$ | 11.05 % |
| $NO_3^--N$ | 6.0 % |
| ges.-$P_2O_5$ | 17.02 % |
| neutr.-citrl. $P_2O_5$ | 16.85 % |
| water-soluble $P_2O_5$ | 15.75 % |
| $K_2O$ | 17.05 % |
| $H_2O$ | 0.65 % |

What is claimed is:

1. A process for decomposing phosphate rock with nitric acid in order to produce phosphoric acid having a high fertilizer-nutrient content and as a by-product a well filterable semihydrate of calcium sulfate which consists essentially of:
   (A) decomposing phosphate rock having a $P_2O_5$ content up to 40% by weight
   (B) with nitric acid, the amount of acid adjusted to a molar ratio of $H^+:P_2O_5$ equal to or greater than 7 but less than or equal to 17 and
   (C) adjusting the water content of the decomposing mixture such that the produced nitrogen-containing phosphoric acid has a water content of 20 to 55% by weight, recycling amounts of wash water from step (G);
   (D) adjusting the sulfate ion content so that there are at least 10 and up to 150 g free sulfate ions per liter of solution;
   (E) agitating the resulting slurry thereby effecting precipitation and recrystallization of calcium ions as well as filterable calcium sulfate semihydrate;
   (F) separating said well filterable calcium sulfate semihydrate from supernatant liquid;
   (G) washing the separated calcium sulfate semihydrate with wash water and recycling at least a portion of such wash water to step (C) to adjust the water content thereof; and
   (H) recovering as the liquid a nitrogen-containing phosphoric acid.

2. A process according to claim 1 wherein the water content in step (C) is adjusted to be between 25 and 40% by weight.

3. A process according to claim 1 wherein no sulfuric acid is employed in step (B) and the water content in step (C) is adjusted so that usually 35 to 60 weight percent HNO$_3$, ammonium sulfate or potassium sulfate is added to adjust the sulfate ion concentration according to step (D), steps (A) and (E) being performed at a temperature in the range of 60° to 100° C.

4. A process according to claim 3 wherein the nitric acid content in step (C) is adjusted to be between 45 and 55% HNO$_3$ by weight.

5. A process according to claim 1 wherein sulfuric acid is employed in step (B) in such an amount that not all calcium ions are precipitated and additional sulfate ions are added in step (D) in the form of ammonium sulfate or sulfuric acid and steps (A) and (E) are effected at a temperature of 60° to 100° C.

6. A process according to claim 1 wherein sulfuric acid is employed in step (B) in such an amount that not all calcium ions are precipitated and additional sulfate ions are added in step (D) in the form of ammonium sulfate or sulfuric acid and steps (A) and (E) are effected at a temperature of 60° to 100° C.

7. A process according to claim 1 wherein the precipitated well filterable calcium sulfate semihydrate is recovered by filtration.

8. A process according to claim 1 wherein the precipitated filterable calcium sulfate semihydrate is recovered by filtration.

9. A process according to claim 1 wherein no sulfuric acid is employed in step (B) and the water content in step (C) is adjusted by the condition that nitric acid of 35 to 60 weight percent HNO$_3$ is employed and sulfate is employed in the form of sulfuric acid according to step (D), step (A) being performed at a temperature of 60° to 100° C. and step (E) is effected at a temperature in the range of 70° to 100° C.

10. A process according to claim 9 wherein the nitric acid content in step (C) is adjusted to be between 45 and 55 percent HNO$_3$ by weight.

11. A process for decomposing phosphate rock with nitric acid of 35 to 60% HNO$_3$ by weight to produce phosphoric acid having a high fertilizer-nutrient content and as by-product a well filterable semihydrate of calcium sulfate which consists essentially of:

(A) decomposing phosphate rock having a P$_2$O$_5$ content up to 40% by weight (B) with nitric acid in the absence of sulfuric acid, the amount of acid adjusted to a molar ratio of H$^+$:P$_2$O$_5$ equal to or larger than 7 but less than or equal to 17;

(C) adjusting the resulting decomposition solution to an actual nitric acid content of 35 to 60% by weight;

(D) adding sulfate in the form of ammonium sulfate or potassium sulfate such that the sulfate ion is present in an amount of at least 10 to up to 150 g free sulfate ions per liter solution;

(E) agitating this slurry whereby under the conditions of temperature and concentration recrystallization of substantially all calcium ions is effected together with precipitation of a well filterable calcium sulfate semihydrate;

(F) separating said well filterable calcium sulfate semihydrate from supernatant liquid;

(G) washing said well filterable calcium sulfate semihydrate with water and employing the resultant wash water in step (C) to adjust the nitric acid concentration in step (C); and (H) recovering as liquid phase of the process a nitrogen-containing phosphoric acid.

12. A process according to claim 11 wherein steps (A) and (E) are performed at a temperature of about 60° to 100° C.

13. A process according to claim 12 wherein the nitric acid content in step (C) is adjusted so that it is between 45 and 55% by weight.

14. A process according to claim 12 wherein the precipitated filterable calcium sulfate semihydrate is recovered by filtration.

15. A process according to claim 11 wherein step (A) is performed at a temperature between 60° and 100° C.; step (D) is performed by adding sulfate ions in the form of sulfuric acid; and step (E) is performed at a temperature between 70° and 110° C.

16. A process according to claim 11 wherein the precipitated filterable calcium sulfate semihydrate is recovered by filtration.

* * * * *